Nov. 10, 1964  S. F. EYESTONE ETAL  3,156,047

CAVITY GAUGE AND METHOD FOR MEASURING A CAVITY

Filed Feb. 9, 1961  4 Sheets-Sheet 1

INVENTORS
SHIRLEY F. EYESTONE
STANLEY W. COGAN
BY JOSEPH A. MEHM

Ernest L. Brown
ATTORNEY

INVENTORS
SHIRLEY F. EYESTONE
STANLEY W. COGAN
BY JOSEPH A. MEHM

*Ernest L. Brown*
ATTORNEY

Nov. 10, 1964    S. F. EYESTONE ETAL    3,156,047
CAVITY GAUGE AND METHOD FOR MEASURING A CAVITY
Filed Feb. 9, 1961    4 Sheets-Sheet 3

INVENTORS
SHIRLEY F. EYESTONE
STANLEY W. COGAN
BY JOSEPH A. MEHM

Ernest L. Brown
ATTORNEY

Nov. 10, 1964  S. F. EYESTONE ETAL  3,156,047
CAVITY GAUGE AND METHOD FOR MEASURING A CAVITY
Filed Feb. 9, 1961  4 Sheets-Sheet 4

INVENTORS
SHIRLEY F. EYESTONE
STANLEY W. COGAN
BY JOSEPH A. MEHM

Ernest L. Brown
ATTORNEY

United States Patent Office 3,156,047
Patented Nov. 10, 1964

3,156,047
CAVITY GAUGE AND METHOD FOR MEASURING
A CAVITY
Shirley Frederick Eyestone and Stanley W. Cogan, Whittier, and Joseph A. Mehm, Huntington Park, Calif., assignors to North American Aviation, Inc.
Filed Feb. 9, 1961, Ser. No. 88,199
10 Claims. (Cl. 33—174)

This invention pertains to a cavity gauge and to a method for measuring a cavity. More particularly the invention pertains to a cavity gauge which measures the deviation from a true circle along one partial circumference of a circular cavity. Still more particularly, the device of this invention is a mechanism which is adapted to measure and which uses a method for measuring along one partial circumference of a spherical cavity to determine the deviation of the surface from a true circle.

In machining operations it is frequently desirable to machine a spherical or cylindrical cavity in a casting, forging, or the like. When the machining operation is completed, it is usually necessary to inspect the spherical or cylindrical cavity to determine if it is truly spherical or cylindrical.

The device of this invention was designed and built to inspect and measure the roundness of a spherical cavity. It will become apparent that it may also be utilized to measure the roundness of a cylindrical cavity.

When the device of this invention is used to measure the roundness of a cylindrical cavity, the cavity must first be aligned to cause the feeler gauge to traverse a substantially circular path.

When the device of this invention is used to measure the roundness of a spherical cavity, it must be aligned to cause the feeler gauge to traverse a substantially circular path along a predetermined circumference of the sphere.

The device shown and described was designed to measure the roundness of a spherical cavity indented from a flat surface. If the spherical cavity is indented from a non-flat surface, it is apparent that the mechanism may be modified to support the inspected piece at predetermined support surfaces.

It is therefore an object of this invention to measure the roundness of a substantially round cavity.

It is also an object of this invention to measure the roundness of a spherical cavity.

It is an object of this invention to measure the roundness of a cylindrical cavity.

It is also an object of this invention to teach a method for measuring a cavity.

It is another object of this invention to inspect indented circular surfaces.

It is also an object of this invention to inspect spherical or cylindrical indented surfaces.

It is a particular object of this invention to gauge the roundness of a spherical cavity to extremely precise measurement.

It is a more particular object of this invention to gauge the roundness of a spherical cavity indented from a flat surface and to gauge the roundness with extreme precision.

Other objects will become apparent from the following description, taken together with the accompanying drawings in which.

A supporting means or frame 10 is adapted to be positioned upon a table or the like (not shown) and to support both the inspecting device of this invention and the piece 120 which is being inspected.

Figure 1:
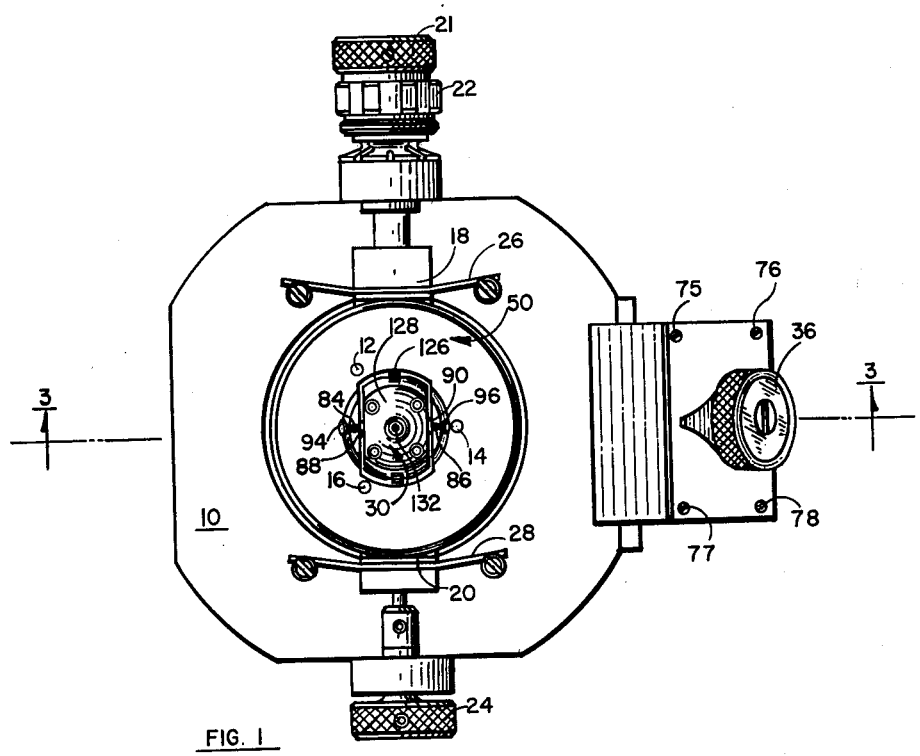
FIG. 1 is a top view of the inspecting device of this invention.
Figure 2:
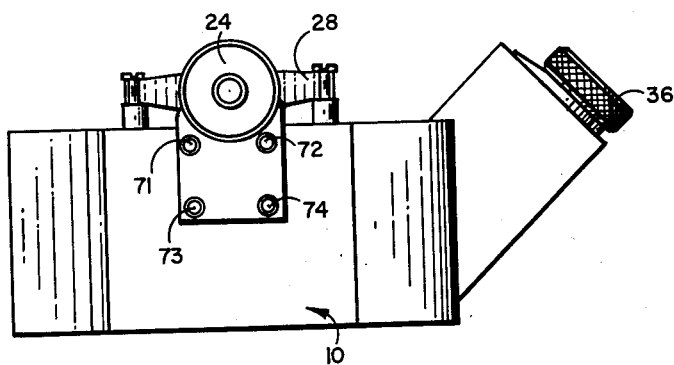
FIG. 2 is a side view of the inspecting device of this invention.
Figure 3:
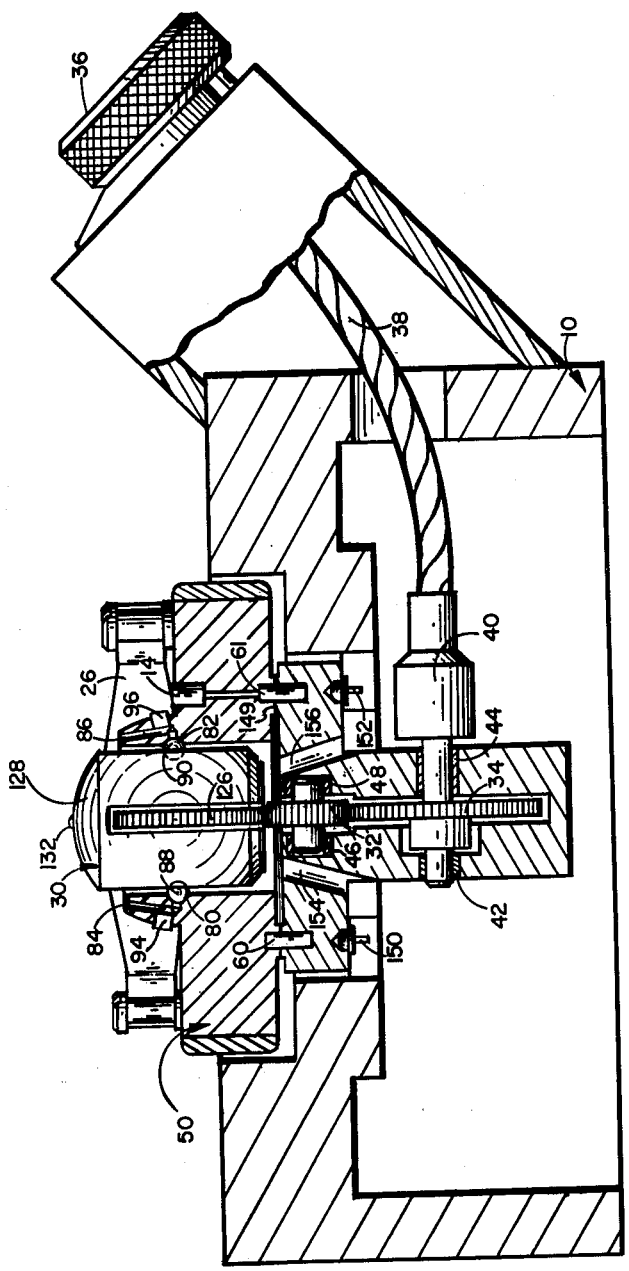
FIG. 3 is a view, partially in section and partially in profile, taken at 3—3 in FIG. 1.
Figure 4:
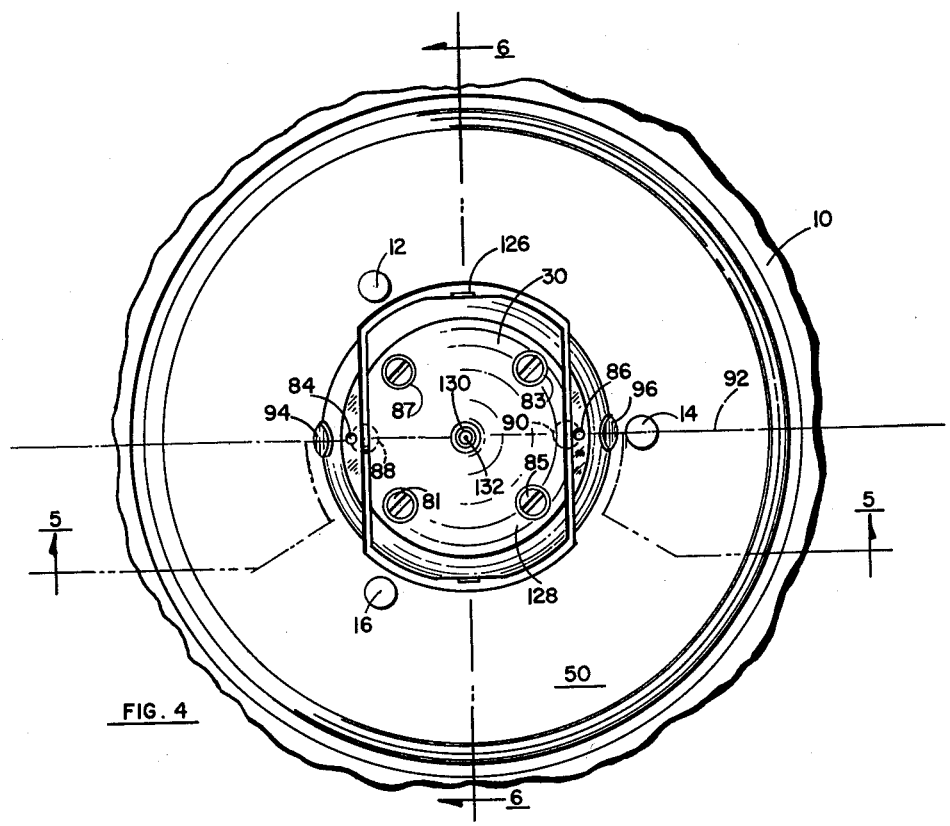
FIG. 4 is an enlarged detailed view of the central portion of FIG. 1.
Figure 6:
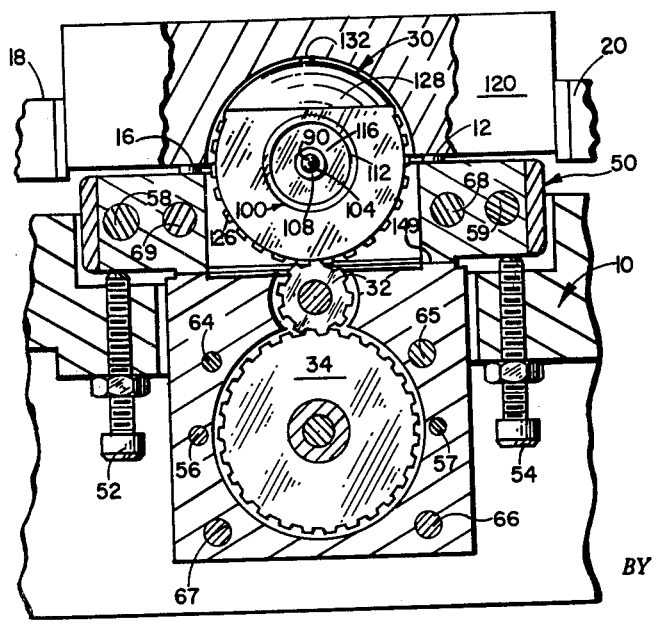
FIG. 6 is a view, partially in section and partially in profile, taken at 6—6 in FIG. 4.
Figure 5:
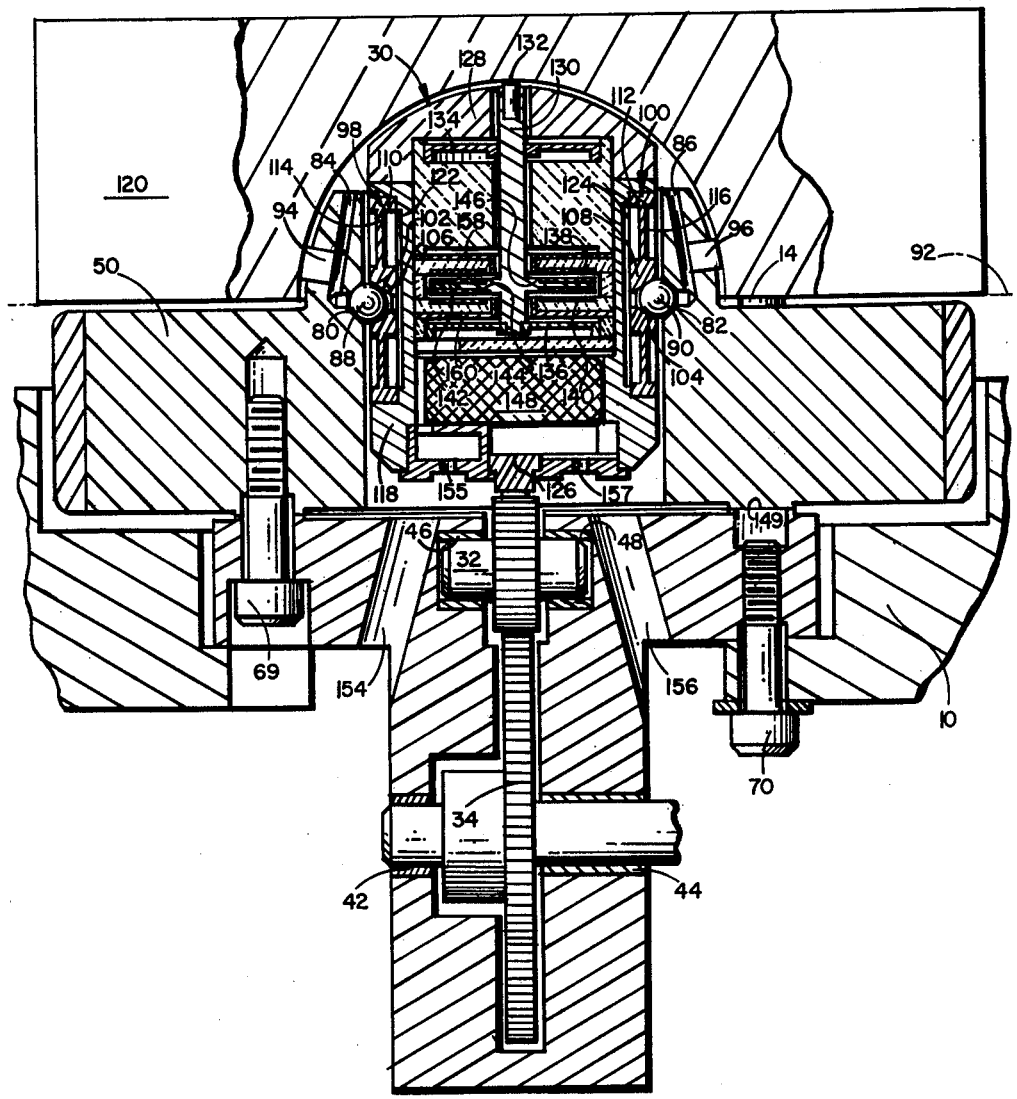
FIG. 5 is a view, partially in section and partially in profile, taken at 5—5 in FIG. 4.

The shown piece 120 which is being inspected (see FIGS. 5 and 6) has a spherical cavity indented from a planar surface. Positioning means, such as mounting buttons 12, 14, and 16 are supported by frame 10 with their exposed supporting surfaces in a known plane. The planar surface of the piece 120 is adapted to be mounted upon and supported by these mounting buttons. It is to be stressed that if the surface, of piece 120, to be supported were some other shape than a plane that the position and/or shape of mounting buttons 12, 14, and 16 would need to be altered to conform to the supported piece.

The inspecting device of this invention utilizes housing means such as the rotatable structure 30, mounted for rotation, relative to frame 10, about a pre-positioned axis of rotation 92. Because it is desired that the center of curvature of the spherical cavity of piece 120 be in the plane of the surface of buttons 12, 14, and 16, the axis of rotation 92 is shown in the plane of the surface of buttons 12, 14, and 16. It is to be noted that the position of axis 92 may be different from that shown when it is desired to cause the surface of the cavity of piece 120 to be different than a semi-circular one. It is further to be noted that the piece 120 could have a circular cylindrical cavity rather than a spherical one. With a circularly cylindrical cavity an additional alignment problem would be apparent, namely alignment of the axis of the cylinder with the axis of rotation of rotatable structure 30. This could be accomplished by external means or, for example, by additional alignment gauge blocks (not shown).

Feeler gauge means such as extensible feeler or stylus 130 is mounted upon rotatable structure 30 and is adapted to be extensible from axis 92 in a radial direction.

A means is attached to feeler 130 for measuring the extension of feeler 130 such as the capacitive bridge utilizing conductive plates 138, 140 attached to frame 118 of structure 30 and plates 142, 144 attached to flange 146 of feeler 130. It is to be noted that other measuring means may be utilized such as, for example, resistive or inductive pickoffs.

Housing means 30 supports a first pair of flexible diaphragms 98 and 100 with their hubs 106 and 108 coaxial along axis of rotation 92. Diaphragms 98 and 100 are preferably circular with circular rims 110 and 112 and with circular webs or membranes 114 and 116. Diaphragms 98 and 100 are preferably identical with their rims mounted upon frame 118 of rotatable member 30 in coaxial recesses adapted to that purpose. The recesses in frame 118 have clearances 122 and 124 to allow flexing of the webs and axial positioning of the hubs.

Each hub 106 and 108 has on its exterior face a conical journal bearing 102 and 104. Conical bearings 102 and 104 have coaxial axes of symmetry which are positioned upon axis of rotation 92. The conical bearings 102 and 104 diverge outwardly from structure 30.

A second pair of conical journal bearings 80 and 82 are positioned coaxially with their diverging direction toward each other. Supporting means 10 forms a space, between conical bearings 80 and 82, to allow rotatable structure 30 to be positioned for rotation.

A pair of spherical balls 88 and 90 are positioned between the conical bearings 80, 82 and the conical bearings 102, 104 to support structure 30 for rotation. In the preferred embodiment of this invention the apex angles of bearings 80 and 82 are larger than the apex angles of bearings 102 and 104 to cause relative movement or rotation between balls 88, 90 and bearings 80 and 82. There is no relative rotation between balls 88, 90 and bearings 102, 104. Lubricating channels 84 and 86 need be connected only to bearings 80, 82. Further, in the preferred embodiment of this invention, the bearings are symmetrical, i.e., bearings 80 and 82 are identical, balls 88 and 90 are identical, and bearings 102 and 104 are identical.

With housing 30 mounted for rotation, webs 114 and 116 are slightly flexed to bias balls 88, 90 into engagement with bearings 80, 82 and 102, 104.

A feeler gauge or stylus 130 is mounted upon rotatable support 30 for extensible movement perpendicular to the axis of rotation. A pair of flexible diaphragms 134 and 136 are mounted upon frame 118 with at least their hubs axially aligned along an axis perpendicular to the axis of rotation 92. In the preferred embodiment, diaphragms 134 and 136 are identical. Each diaphragm 134 and 136 has a substantially rigid rim and hub and a flexible web or membrane. The planes of diaphragms 134 and 136 are spaced apart to provide rigid positioning for feeler 130. Feeler 130 is mounted coaxially with the hubs of diaphragms 134 and 136, and is attached to said hubs to maintain the motion of feeler 130 along an axis perpendicular to axis 92. The webs of diaphragms 134 and 136 are adapted to flex to bias feeler 130 radially outward from axis 92 and into engagement with the inspected piece 120. The end of feeler 130 has a diamond contact member or tip 132 with a rounded end. Diamond is preferable because of its wear quality and its dimensional stability. Member 132 is rounded to avoid scratching the inspected piece 120.

A simple capacitive pickoff, adapted to be used with a capacitance bridge, is shown. To detect motion of feeler 130 a pair of spaced-apart planar electrodes 138 and 140 are attached to frame 118. A collar or piston-like member 146 carries two spaced-apart planar electrodes 142 and 144 attached to movable feeler 130. Alternatively collar 146 is made of metal, the surfaces of which can be used for electrodes 142 and 144. Electrical connections (not shown) are connected between transformer 148 and electrodes 138, 140. Transformer 148 is connected to external circuitry by electrical wires (not shown) through electrical channels 156 and 157. Electrodes 142 and 144 are equal potential surfaces which are preferably connected through the metal body of feeler 130 to external wires (not shown) which are channeled through electrical channels 154 and 155. Electrical capacitive shielding for the capacitive pickoff is positioned at grounded members 158 and 160.

The refractive spacers (not numbered) on the interior of frame 118 are preferably fabricated of quartz for both their electrical qualities and their dimensional stability.

A segmented ring gear 126 is mounted symmetrically with respect to feeler 130 upon the exterior of frame 118 in a plane perpendicular to the axis of rotation of structure 30 so that when gear 126 is driven, structure 30 is rotated about axis 92. Ring gear 126 is engaged by idler gear 32 which is mounted upon bearings 46, 48 and which is driven by gear 34, mounted upon bearings 42, 44. Gear 34 is coupled by coupler 40 to a flexible shaft 38 which is connected to be driven by calibrated dial member 36. The calibration marks of dial member 36 are preferably in degrees and the gear ratios of gears 126, 32, and 34 are such that the position of dial 36 and the position of rotatable structure 30 has a one-to-one correspondence. It is frequently desirable to place a stop (not shown) on the motion of dial 36 or its associated gear train to prevent the positioning of feeler 30 outside of the cavity to be inspected.

It is preferable that the support load upon gear 32 be reduced to a negligible value. If rotatable structure 30 were supported upon gear 32, the alignment of axis 92 would be disturbed. Further, the additional load would require that the flexible lead 38 twist which would disturb the calibration of the dial of knob 36. To lift structure 30 off of gear 32, the portion of frame 10 which supports bearings 80, 82 is made in a separate piece 50 which is supported relative to the outer part of frame 10 by screws 52, 54 shown in FIG. 6.

When the device of this invention is used to gauge a spherical cavity, positioning buttons 94 and 96 are mounted within the sphere engaging portions of member 50, centrally to align the spherical cavity to cause feeler point 132 to trace a partial circumference.

Elements 56, 57, 58, 59, 60 and 61 are alignment dowels and elements 63, 64, 65, 66, 67, 68, 69, 70, 71, 72, 73, 75, 76, 77, 78, 79, 81, 83, 85, and 87, are connecting screws.

To center the test piece 120, a pair of chucks 18 and 20 are spring-biased by springs 26 and 28 toward the piece 120 which is being inspected. Adjustment of chucks 18 and 20 is accomplished by course adjusting screws 21 and 24 and fine adjusting screw 22.

To align the plane of buttons 12, 14, and 16 and the axis 92, gear 32 is disengaged (by removal) from gear 126. An optical flat is placed on surface 149. Feeler point 132 is positioned in a 90° downward position contacting the optical flat. The electrical output of the capacitance bridge of electrodes 138, 140, 142 and 144 is read. This reading corresponds to a known position of tip 132, i.e., the known distance between axis 92 and surface 149.

Gauge blocks are then placed on buttons 12, 14, and 16 to build a height which is equal to the known distance from the axis 92 to surface 149. An optical flat is placed over the gauge blocks. The point 132 of feeler 130 is positioned in its 90° upward position contacting the optical flat. If the electrical output of the capacitance bridge is not the same as it was in the 90° downward position, buttons 12, 14, and 16 must be altered in shape or position.

There is a known thermal expansion for the mechanical parts of the device of this invention. The thermal expansion is plotted against temperature. A thermocouple and bridge is utilized to obtain a temperature reading at feeler gauge 130. If an absolute or true dimension is desired, rather than a comparison of values, correction is inserted in the readings of the device of this invention to compensate for temperature.

In operation, a test piece or piece 120 to be inspected is positioned between chucks 18 and 20. The position of piece 120 in a direction along axis 92 is controlled by buttons 94 and 96. With a hemispherical cavity in piece 120, structure 30 is turned—for example—20° above the equator of the hemispherical cavity (i.e., the plane of buttons 12, 14, and 16) and the output of the capacitance bridge is read. The angular position of structure 30 is then turned to its 160° position where the output of the capacitance bridge is again read. If the output of the capacitance bridge when the structure 30 is at 160° is materially different from the output of the capacitance bridge when the structure 30 is at 20°, the position of chucks 18 and 20 is adjusted in a direction to reduce the difference. When the readings at the 20° and 160° position are approximately equal the device is ready for operation. The electrical output of the capacitance bridge is calibrated directly in length. Housing 30 is turned in small increments (for example 5° increments) and a reading of the output of he capacitance bridge is taken at each increment. The readings may then be tabulated and plotted.

During the adjustment of piece 120 and during the taking of readings, the angular position of structure 30 is controlled by the rotation of knob 36, thence through flexible shaft 38, coupler 40, gear 34, gear 32, and gear 126.

After the spherical cavity of piece 120 has been inspected across one partial circumference, the piece 120 may be turned about the polar axis of the spherical cavity (for example 120°) to a new circumference and the procedure repeated to obtain a profile of the cavity indentation in piece 120 over that new circumference.

This invention also encompasses the concept of a measuring method which is particularly adapted to measure a circular cavity. The first step of the method is to position a means forming a circular cavity (such as piece 120) into a predetermined position (for example, on buttons 12, 14, and 16) relative to a measuring site such as—for example—the center of rotation of feeler 130. The second step of the method is to extend a measuring instrument (for example, feeler 130) from the measuring site to contact the interior of the circular cavity. The third step of the method is to measure both the direction the instrument is extended (read from the dial of knob 36) and the length the feeler is extended (from the output of the capacitive pickoff described above).

The device of this invention is an inspecting device and the method of this invention is adapted to have extreme precision in determining the circular profile of a spherical or cylindrical cavity or indentation in a piece to be inspected. Extreme precision is achieved primarily through the use of conical bearings, balls between the conical bearings, diaphragms rigid in a plane and flexible along their axis, and means for rotating the inspecting device without loading it.

Although the device has been described in detail in the specification, it is not intended that the invention should be limited by the description but only in accordance with the spirit and scope of the following claims.

We claim:

1. In combination: supporting means; positioning means for positioning a device to be inspected upon said supporting means; housing means; first and second diaphragm means each having a substantially rigid rim and hub and a flexible web; first and second conical bearing journals having, respectively, first and second apex angles and positioned, respectively, upon said hubs; means for attaching said first and second diaphragm means at their rims to opposite sides of said housing means with the cones of said journals diverging outward from said housing means and with the axes of said cones aligned; third and fourth conical bearing journals having, respectively, third and fourth apex angles and positioned upon said supporting means with their axes aligned and their diverging directions toward each other; said supporting means forming a space, between said third and fourth conical journals, for positioning said housing means to allow rotation in said space; a first spherical ball positioned between said first and third conical journals to support said housing means for rotation relative to said support means and to align the axes of said first and third conical bearings; a second spherical ball positioned between said second and fourth conical journals to support said housing means for rotation relative to said support means and to align the axes of said second and fourth conical bearings to cause the axes of said bearings to be aligned along the axis of rotation of said housing means; said first and second diaphragm means biasing said balls into engagement with and spring-loading said bearings; feeler gauge means mounted upon said housing means and adapted to be extensible from said axis of rotation in a radial direction; and means for measuring the extension of said feeler gauge means.

2. In combination: supporting means; positioning means for positioning a device to be inspected upon said supporting means; housing means; first and second diaphragm means each having a substantially rigid rim and hub and a flexible web; first and second conical bearing journals having, respectively, first and second apex angles and positioned, respectively, upon said hubs; means for attaching said first and second diaphragm means at their rims to opposite sides of said housing means with the cones of said journals diverging outward from said housing means and with the axes of said cones aligned; third and fourth conical bearing journals having, respectively, third and fourth apex angles, said third apex angle being larger than said first apex angle and said fourth apex being larger than said second apex angle, positioned upon said supporting means with their axes aligned and their diverging directions toward each other; said supporting means forming a space, between said third and fourth conical journals, for positioning said housing means to allow rotation in said space; a first spherical ball positioned between said first and third conical journals to support said housing means for rotation relative to said support means and to align the axes of said first and third cones; a second spherical ball, positioned between said second and fourth conical journals to support said housing means for rotation relative to said support means and to align the axes of said second and fourth cones to cause the axes of said cones to be aligned along the axis of rotation of said housing means; said first and second diaphragm means biasing said balls into engagement with and spring-loading said bearings; feeler gauge means mounted upon said housing means and adapted to be extensible from said axis of rotation in a radial direction; and means for measuring the extension of said feeler gauge means.

3. In combination: supporting means; positioning means for positioning a device to be inspected upon said supporting means; housing means; first and second diaphragm means each having a substantially rigid rim and hub and a flexible web; first and second conical bearing journals having a first apex angle and positioned, respectively, upon said hubs; means for attaching said diaphragm means at their rims to opposite sides of said housing means with the cones of said journals diverging outward from said housing means and with the axes of said cones aligned; third and fourth conical bearing journals having a second apex angle which is larger than said first apex angle and positioned upon said supporting means with their axes aligned and their diverging directions toward each other; said supporting means forming a space, between said third and fourth conical journals, for positioning said housing means to allow rotation in said space; a first spherical ball positioned between said first and third conical journals to support said housing means for rotation relative to said support means and to align the axes of said first and second cones; a second spherical ball positioned between said second and fourth conical journals to support said housing means for rotation relative to said support means and to align the axes of said second and fourth cones to cause the axes of said cones to be aligned along the axis of rotation of said housing means; said first and second diaphragm means biasing said balls into engagement with and spring-loading said bearings; feeler gauge means mounted upon said housing means and adapted to be extensible from said axis of rotation in a radial direction; and means for measuring the extension of said feeler gauge means.

4. In combination: supporting means; positioning means for positioning a device to be inspected upon said supporting means; housing means; first and second diaphragm means each having a substantially rigid rim and hub and a flexible web; first and second conical bearing journals having a first apex angle and positioned, respectively, upon said hubs; means for attaching said diaphragm means at their rims to opposite sides of said housing means with the cones of said journals diverging outward from said housing means and with the axes of said cones aligned; third and fourth conical bearing journals having a second apex angle and positioned upon said supporting means with their axes aligned and their diverging directions toward each other; said supporting means forming a space between said third and fourth conical journals for positioning said housing means for rotation in said space; a first spherical ball positioned between said first and third conical journals to support said housing means for rotation relative to said support means and to align the axes of said first and third cones; a second spherical ball positioned between said second and fourth conical journals to support said housing means for rotation relative to said support means and to align the axes of said second and fourth cones to cause the axes of said cones to be aligned along the axis of rotation of said housing means; said first and second diaphragms biasing said balls into engagement and spring-loading said bearings; means for lubricating said third and fourth conical journals; feeler gauge means mounted upon said housing means and adapted to be extensible from said axis of rotation in a radial direction; and means for measuring the extension of said feeler gauge means.

5. In combination: supporting means; positioning means for positioning a device to be inspected upon said supporting means; housing means; first and second diaphragm means each having a substantially rigid rim and hub and a flexible web; first and second conical bearing journals having, respectively, first and second apex angles, and positioned respectively, upon said hubs; means for attaching said diaphragm means at their rims to opposite sides of said housing means with the cones of said journals diverging outward from said housing means and with the axes of said cones aligned; third and fourth conical bearing journals having, respectively, third and fourth apex angles with said third apex angle larger than said first apex angle and said fourth apex angle larger than said second apex angle and positioned upon said supporting means with their axes aligned and their diverging directions toward each other; said supporting means forming a space, between said third and fourth conical journals, for positioning said housing means to allow rotation in said space; a first spherical ball positioned between said first and third conical journals to support said housing means for rotation relative to said support means and to align the axes of said first and third cones; a second spherical ball positioned between said second and fourth conical journals to support said housing means for rotation relative to said support means and to align the axes of said second and fourth cones to cause the axes of said cones to be aligned along the axis of rotation of said housing means; means for lubricating said third and fourth conical journals; said first and second diaphragm means biasing said balls into engagement with and spring-loading said bearings; feeler gauge means mounted upon said housing means and adapted to be extensible from said axis of rotation in a radial direction; and means for measuring the extension of said feeler gauge means.

6. In combination: supporting means; positioning means for positioning a device to be inspected upon said supporting means; housing means; first and second diaphragm means each having a substantially rigid rim and hub and a flexible web; first and second conical bearing journals having a first apex angle and positioned, respectively, upon said hubs; means for attaching said diaphragm means at their rims to opposite sides of said housing means with the cones of said journals diverging outward from said housing means and with the axes of said cones aligned; third and fourth conical bearing journals having a second apex angle and positioned upon said supporting means with their axes aligned and their diverging directions toward each other; said supporting means forming a space between said third and fourth conical journals, for positioning said housing and for allowing rotation in said space; a first spherical ball positioned between said first and third conical journals to support said housing means for rotation relative to said support means and to align the axes of said first and third cones; a second spherical ball positioned between said second and fourth conical journals to support said housing means for rotation relative to said support means and to align the axes of said second and fourth cones to cause the axes of said cones to be aligned along the axis of rotation of said housing means; said first and second diaphragm means biasing said balls into engagement with and spring-loading said bearings; feeler gauge means mounted upon said housing means and adapted to be extensible from said axis of rotation in a radial direction; and means for measuring the extension of said feeler gauge means.

7. In combination: supporting means; positioning means for positioning a device to be inspected upon said supporting means; housing means; first and second diaphragm means each having a substantially rigid rim and hub and a flexible web; first and second conical bearing journals having a first apex angle and positioned, respectively, upon said hubs; means for attaching said diaphragm means at their rims to opposite sides of said housing means with the cones of said journals diverging outward from said housing means and with the axes of said cones aligned; third and fourth conical bearing journals having a second apex angle and positioned upon said supporting means with their axes aligned and thier diverging directions toward each other; said supporting means forming a space, between said third and fourth conical journals, for positioning said housing means to allow rotation in said space; a first spherical ball positioned between said first and third conical journals to support said housing means for rotation relative to said support means and to align the axes of said first and third cones; a second spherical ball positioned between said second and fourth conical journals to support said housing means for rotation relative to said support means and to align the axes of said second and fourth cones to cause the axes of said cones to be aligned along the axis of rotation of said housing means; said first and second diaphragm means biasing said balls into engagement with and spring-loading said bearings; means for lubricating said conical journals; feeler gauge means mounted upon said housing means and adapted to be extensible from said axis of rotation in a radial direction; and means for measuring the extension of said feeler gauge means.

8. In combination: supporting means; positioning means for positioning a device to be inspected upon said supporting means; housing means; first and second diaphragm means each having a substantially rigid rim and hub and a flexible web; first and second conical bearing journals having, respectively, first and second apex angles and positioned, respectively, upon said hubs; means for positioning said diaphragm means upon opposite sides of said housing means with the cones of said journals diverging outward from said housing means and with the axes of said cones aligned; third and fourth conical bearing journals having, respectively, third and fourth apex angles and positioned upon said supporting means with their axes aligned and their diverging directions toward each other; said supporting means forming a space, between said first and third conical journals, for positioning said housing means to allow rotation in said space; a first spherical ball positioned between said first and third conical journals to support said housing means for rotation relative to said support means and to align the axes of said first and third cones; a second spherical ball positioned between said second and fourth conical journals to support said housing means for rotation relative to said support means and to align the axes of said second and fourth cones to cause the axes of said cones to be aligned along the axis of rotation of said housing means; said first and second diaphragm means biasing said balls into engagement and spring-loading said bearings; means for lubricating said conical journals; feeler gauge means mounted upon said housing means and adapted to be extensible from said axis of rotation in a radial direction; and means for measuring the extension of said feeler gauge means.

9. Means for inspecting a structure which has a substantially circular-shaped cavity comprising: a support; positioning means for positioning a structure to be inspected upon said support; a housing; first and second diaphragms each having a substantially rigid rim and hub and a flexible web; first and second conical bearing journals having a first apex angle and positioned, respectively, upon said hubs; means for attaching said diaphragms at their rims to opposite sides of said housing with the cones of said journals diverging outward from said housing and with the axes of said cones aligned; third and fourth conical journals having a second apex angle which is greater than said first apex angle and positioned upon said support with their axes aligned and their diverging direction toward each other; said support forming a space, between said third and fourth conical journals, for positioning said housing and allowing its rotation in said space; a first spherical ball positioned between said first and third conical journals to support said housing for rotation relative to said support and to align the axes of said first and third cones; a second spherical ball positioned between said second and fourth conical journals to support said housing for rotation relative to said support and to align the axes of said second and fourth cones to cause the axes of said cones to be aligned with the axis of rotation of said housing; said first and second diaphragms biasing said balls into engagement with and spring-loading said bearings; third and fourth diaphragms, each having a substantially rigid rim and hub and a flexible web, mounted at their rims upon said housing in spaced-apart planes with at least their hubs in axial alignment along an axis perpendicular to said first axis of rotation, said last named axis being rotatable with said housing in a plane perpendicular to said first axis; a feeler gauge mounted upon the hubs of said third and fourth diaphragms for extensible motion along said last named axis, said diaphragms biasing said feeler gauge into its radially extended position; a capacitive pickoff positioned and adapted to be sensitive to motion of said gauge and to generate a signal which is a measure of the position of said gauge; and drive means for rotating and angularly positioning said housing and said gauge at a controlled angle about the axis of rotation of said housing.

10. A device as recited in claim 9 in which said drive means comprises: a segmented ring gear mounted symmetrically with respect to said gauge upon the outer periphery of said housing in a plane perpendicular to the axis of rotation of said housing; gear means engaging said segmented gears; and means for controllably positioning said last named gear means.

References Cited in the file of this patent
UNITED STATES PATENTS

| | | |
|---|---|---|
| 2,051,636 | Gastrich | Aug. 18, 1936 |
| 2,299,997 | Ladrach | Oct. 27, 1942 |
| 2,599,835 | Johnson et al. | June 10, 1952 |
| 2,843,939 | Aller | July 22, 1958 |
| 2,913,829 | Arlin | Nov. 24, 1959 |